(12) United States Patent
Minhas (10) Patent No.: US 8,223,385 B2
(45) Date of Patent: Jul. 17, 2012

(54) PRINTER JOB VISUALIZATION

(75) Inventor: Rajinderjeet S. Minhas, Churchville, NY (US)

(73) Assignee: Xerox Corporation, Norwalk, CT (US)

( * ) Notice: Subject to any disclaimer, the term of this patent is extended or adjusted under 35 U.S.C. 154(b) by 1622 days.

(21) Appl. No.: 11/635,741

(22) Filed: Dec. 7, 2006

(65) Prior Publication Data

US 2008/0137914 A1 Jun. 12, 2008

(51) Int. Cl.
- G06K 15/00 (2006.01)
- G06K 1/00 (2006.01)
- G06F 15/00 (2006.01)
- H04N 1/407 (2006.01)
- H04N 1/40 (2006.01)

(52) U.S. Cl. ...... 358/1.18; 358/1.9; 358/3.26; 358/3.29; 703/7; 399/81; 399/138

(58) Field of Classification Search .......... 358/1.1–1.18, 358/3.29, 474; 703/7; 345/543, 419; 715/274; 709/222; 347/19
See application file for complete search history.

(56) References Cited

U.S. PATENT DOCUMENTS

| | | | |
|---|---|---|---|
| 5,717,978 A | 2/1998 | Mestha | |
| 6,351,308 B1 | 2/2002 | Mestha | |
| 6,366,358 B1 * | 4/2002 | Satou et al. | 358/1.14 |
| 6,384,918 B1 | 5/2002 | Hubble, III et al. | |
| 6,519,552 B1 | 2/2003 | Sampath et al. | |
| 6,538,770 B1 | 3/2003 | Mestha | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,665,425 B1 | 12/2003 | Sampath et al. | |
| 6,690,471 B2 | 2/2004 | Tandon et al. | |
| 6,757,076 B1 | 6/2004 | Mestha et al. | |
| 6,760,056 B2 | 7/2004 | Klassen et al. | |
| 6,819,352 B2 | 11/2004 | Mizes et al. | |
| 6,862,414 B2 | 3/2005 | Sampath et al. | |
| 6,892,317 B1 | 5/2005 | Sampath et al. | |
| 6,975,949 B2 | 12/2005 | Mestha et al. | |
| 7,039,570 B2 * | 5/2006 | Herman | 703/7 |
| 7,054,568 B2 | 5/2006 | Mizes et al. | |
| 7,090,324 B2 | 8/2006 | Mizes | |
| 7,095,531 B2 | 8/2006 | Mizes et al. | |
| 7,125,094 B2 | 10/2006 | Mizes | |
| 7,187,884 B2 * | 3/2007 | Bardolatzy et al. | 399/81 |
| 7,196,826 B2 * | 3/2007 | Kodama et al. | 358/474 |

(Continued)

OTHER PUBLICATIONS

U.S. Appl. No. 11/084,280, Filed Mar. 18, 2005, Mizes.

(Continued)

Primary Examiner — Satwant Singh
(74) Attorney, Agent, or Firm — Fay Sharpe LLP (57) ABSTRACT

A system for visualizing a print job includes a print job simulator which applies a print job model to print job image data to generate an image which simulates a rendered image of the print job if the print job were to be printed on a specific marking device. The system also includes a display in communication with the print job simulator for displaying the simulation image. The modified image data displayed on the display enables a customer to see a defect in the print job which would appear if the print job were to be rendered on the specific marking device. The print job model may be derived, at least in part, from information derived from the marking device, such as information derived from image data acquired by scanning a test image which has been rendered by the marking device.

6 Claims, 4 Drawing Sheets

U.S. PATENT DOCUMENTS

| | | | |
|---|---|---|---|
| 7,380,208 B2 * | 5/2008 | Ishii et al. | 715/274 |
| 7,573,596 B2 * | 8/2009 | Owen | 358/1.15 |
| 7,626,732 B2 * | 12/2009 | Grinberg et al. | 358/3.29 |
| 7,728,842 B2 * | 6/2010 | Honmi | 345/543 |
| 7,764,400 B2 * | 7/2010 | Harrington | 358/1.9 |
| 2002/0065843 A1 * | 5/2002 | Sharma et al. | 707/500 |
| 2004/0165024 A1 * | 8/2004 | Vilanova et al. | 347/19 |
| 2004/0257596 A1 * | 12/2004 | Mestha et al. | 358/1.9 |
| 2005/0036159 A1 * | 2/2005 | Sharma et al. | 358/1.9 |
| 2005/0036171 A1 | 2/2005 | Bala et al. | |
| 2005/0099446 A1 | 5/2005 | Mizes et al. | |
| 2005/0132028 A1 * | 6/2005 | Lester et al. | 709/222 |
| 2005/0134624 A1 | 6/2005 | Mizes | |
| 2005/0160092 A1 | 7/2005 | Mestha et al. | |
| 2006/0001911 A1 | 1/2006 | Viassolo et al. | |
| 2006/0110009 A1 | 5/2006 | Klassen et al. | |
| 2006/0115284 A1 | 6/2006 | Grace et al. | |
| 2007/0188485 A1 * | 8/2007 | Yasukawa | 345/419 |

OTHER PUBLICATIONS

U.S. Appl. No. 11/170,638, Filed Jun. 30, 2005, Wu et al.

U.S. Appl. No. 11/476,009, Filed Jun. 28, 2006, Mizes.

* cited by examiner

PRINTER JOB VISUALIZATION

CROSS REFERENCE TO RELATED PATENTS AND APPLICATIONS

The following reference, the disclosure of which is incorporated herein in its entirety by reference, is mentioned:

U.S. Pub. No. 20070003109, published Jan. 4, 2007, entitled AUTOMATED IMAGE QUALITY DIAGNOSTICS SYSTEM, by Wencheng Wu, et al.

BACKGROUND

The exemplary embodiment relates to the imaging arts. It finds particular application in connection with a print job simulator which provides a representation of a print job prior to printing.

Image non-uniformity occurs in the output images of digital image rendering devices, such as copiers, scanners, and printers, for a variety of reasons. Even relatively small non-uniformities can give rise to visibly objectionable print defects. In printing systems, physical alignments, component tolerances, wear and component age can influence the uniformity with which colorants, such as inks and toners, are laid down across the surface of print media. Streaks, for example, are one-dimensional image defects that generally run parallel to the process direction in the printed image. They can arise from non-uniform responses of the subsystems of an image rendering device, such as a xerographic marking engine, and can be constant over time in that they appear in relatively the same location from print to print. Photoreceptor scratches, contamination of the charger wire, non-uniform LED imager output and Raster Output Scanner (ROS) spot size variations, and spatially varying pressure on a bias transfer roll are examples of subsystem defects which can give rise to rendered image streaking in a xerographic marking engine. Bands are also one-dimensional image defects that generally run perpendicular to the process direction in a printed image. They are typically caused by time-varying performance of a marking engine subsystem, such as non-uniform velocity of the photoreceptor drive, out-of-roundness of development rolls, and wobble of the ROS polygon mirror. In a uniform patch of gray, streaks and bands may appear as a variation in the gray level. In general, "gray" refers to the optical density or area coverage value of any single color separation layer, whether the colorant is black, cyan, magenta, yellow, or some other color.

There are various approaches for detecting such defects. For example, test images designed to highlight any problems are rendered by an image rendering device, such as a printer, and captured by an image capturing device, such as a camera, a scanner, or the like. The captured images are compared with a standard test page designed to provide information about the performance of the printer. The existence of an artifact or defect in the image can thereby be detected. The customer or service representative uses the documents to diagnose printer problems, but generally only when the customer is already aware of a problem.

Various methods exist for correcting image quality defects, once they are detected. These include modification of the tone reproduction curves (TRCs) used in converting the original image data into machine-dependent image data. Automated systems have been developed for compensating for non-linearities introduced by an individual image rendering device. One such method involves providing a color sensor inside each image rendering device. The embedded color sensor is used to measure the color characteristics of the color marking device by measuring the color characteristics of an outputted color patch pattern. Feedback information about the color characteristics of the outputted color patch pattern is then input to a multi-dimensional look-up table for the image rendering device to improve the color reproduction.

However, even with such techniques available, image rendering devices can produce images which have noticeable defects. When a sizeable print job is to be printed, a customer may test print a few pages to ensure that the device chosen for rendering is performing satisfactorily. This process can be time consuming and also wastes supplies if the customer decides to check several image rendering devices before printing the job.

INCORPORATION BY REFERENCE

The following references, the disclosures of which are incorporated herein in their entireties by reference, are mentioned.

U.S. Pat. No. 5,717,978, entitled METHOD TO MODEL A XEROGRAPHIC SYSTEM, by L. K. Mestha, discloses an electrostatographic printing machine including a sensor to measure a voltage potential of an imaging member surface and a compensator responsive to the surface voltage potential to provide a first adjustment to the surface voltage potential, the electrostatographic printing machine also changing set point parameters to provide a second adjustment to the surface voltage potential.

U.S. Pat. No. 6,665,425, entitled SYSTEMS AND METHODS FOR AUTOMATED IMAGE QUALITY BASED DIAGNOSTICS AND REMEDIATION OF DOCUMENT PROCESSING SYSTEMS, by Meera Sampath, et al., discloses a system for automated image quality based prognostics, diagnostics and remediation of a document processing system. The system includes a data acquisition and diagnostic processing circuit that collects and processes data. The data may be used to identify defects in the data and initiate printing of test patterns for further diagnosis of the defect.

U.S. Pat. No. 6,757,076, entitled SYSTEMS AND METHODS FOR DEVICE INDEPENDENT COLOR CONTROL TO ACHIEVE ACCURATE COLOR PROOFING AND REPRODUCTION, by L. K. Mestha, et al., discloses a color control system which includes a device independent color control server connectable to a network and at least one color image forming device connectable to the network, each color image forming device containing a color modification system and a color sensor, positioned to measure a color quality of an output image formed by that color image forming device.

U.S. Pat. No. 6,760,056 entitled MACRO UNIFORMITY CORRECTION FOR X-Y SEPARABLE NON-UNIFORMITY, by R. Victor Klassen, et al., discloses a method for compensating for streaks by introducing a separate tone reproduction curve for each pixel column in the process direction. A compensation pattern is printed and then scanned to first measure the ideal tone reproduction curve and then detect and measure streaks. The tone reproduction curves for the pixel columns associated with the streak are then modified to compensate for the streak.

U.S. Pat. No. 6,819,352, entitled METHOD OF ADJUSTING PRINT UNIFORMITY, by Howard A. Mizes, discloses a method of adjusting print uniformity in a xerographic device which includes printing a test pattern, transferring the printed test pattern to a scanner, scanning the printed test pattern and detecting line information, determining measurements from the detected line information, calculating the difference between the measurements and target values, and depending on the difference, adjusting a current supplied to an individual LED of an LED printbar associated with the measurement to reduce the difference.

U.S. Pat. No. 6,862,414, entitled AUTOMATED BANDING DEFECT ANALYSIS AND REPAIR FOR DOCUMENT PROCESSING SYSTEMS, by Meera Sampath, et al., discloses using a system of computer modules operatively associated with a document processing machine for banding defect analysis. Specific test patterns are analyzed via image processing. The banding defects are characterized in terms of quantitative parameters based on an analysis of the banding defect. Key features are extracted from the banding defect parameters. The key features are analyzed in a diagnostic engine, to determine the possible source of the defect. The identified source is correlated to a recommended repair service procedure. The diagnostic process may be augmented by also including machine data in the analysis.

U.S. Pat. No. 6,892,317 entitled SYSTEMS AND METHODS FOR FAILURE PREDICTION, DIAGNOSIS AND REMEDIATION USING DATA ACQUISITION AND FEEDBACK FOR A DISTRIBUTED ELECTRONIC SYSTEM, by Meera Sampath, et al., discloses a system for failure prediction, diagnosis, and remediation of an electronic system in a distributed network which includes a data acquisition circuit that acquires data about the electronic system, a prediction circuit that performs a prognostic or diagnostic analysis of the acquired data, and a repair planning circuit that determines an appropriate autonomous repair action in response to the analysis.

U.S. Pat. No. 6,975,949, entitled FULL WIDTH ARRAY SCANNING SPECTROPHOTOMETER, by L. K. Mestha, et al., discloses a full width array spectrophotometer for full width scanning color analysis of color test targets. The spectrophotometer includes one or two substantially linear elongated arrays of closely spaced multiple LED illumination sources transversely spanning a printer paper path and sequentially illuminated to illuminate a transverse band across a printed sheet moving in the paper path, and a corresponding array of multiple closely spaced different color sensitive photodetectors, which are positioned to detect and analyze light reflected from the sheet.

U.S. Pat. No. 7,054,568, entitled METHOD AND APPARATUS FOR CONTROLLING NON-UNIFORM BANDING AND RESIDUAL TONER DENSITY USING FEEDBACK CONTROL, by Howard A. Mizes, et al., discloses a system and method of determining a residual toner mass on a receiving member.

U.S. Pat. No. 7,090,324, entitled SYSTEMS AND METHODS FOR COMPENSATING FOR STREAKS IN IMAGES, by Howard A. Mizes, discloses a system for compensating for defects in an image forming system which may give rise to visible streaks, or one-dimensional defects in an image that run parallel to the process direction.

U.S. Pat. No. 7,095,531, entitled SYSTEMS AND METHODS FOR COMPENSATING FOR STREAKS IN IMAGES, Publication 2005/0099446, by Howard A. Mizes, discloses a compensation pattern for identifying image defects having a plurality of halftone regions that are lead by, trained by, and separated by rows of fiducial marks.

U.S. Pat. No. 7,125,094, entitled SYSTEMS AND METHODS FOR COMPENSATING FOR STREAKS IN IMAGES (Pub. No. 2005/0134624), and Continuation Application 2006/0244776, by Howard A. Mizes, discloses a method for compensating for streak defects which includes printing a compensation pattern usable to determine a difference in gray level between an actual gray level value and an intended gray level value at a cross-process-direction image-forming device pixel location in the image, scanning the compensation pattern to generate a set of scanned image data, the scanned image data defining an image value for each of a plurality of cross-process direction scanned image pixel locations, analyzing the scanned image data based on the cross-process direction scanned image pixel locations of the marks of the first and second sets of alignment marks to determine at least one actual gray level value for at least one of the plurality of gray level portions for at least one cross-process-direction image-forming device pixel location, and generating a compensation parameter based on the determined actual gray level value for that analyzed gray level portion and the intended gray level value for that analyzed gray level portion.

U.S. Pub. No. 2006/0001911, entitled CLOSED-LOOP COMPENSATION OF STREAKS BY ROS INTENSITY VARIATION, by Daniel E. Viassolo, et al., discloses a method which compensates for streak defects in an image formed using a raster output scanning device. A reflectance profile is generated from an image generated by the raster output scanning device. Thereafter, a difference profile is determined. The difference profile is determined based upon the generated reflectance profile and a uniform profile. A compensation profile is generated based on the determined difference profile. The compensation profile represents a change in an intensity profile for the raster output scanning device.

U.S. Pub. No. 2006/0110009, entitled SYSTEMS AND METHODS FOR DETECTING IMAGE QUALITY DEFECTS, by R. Victor Klassen, et al., discloses a method of detecting image quality defects which includes obtaining an electronic image including electronic image data, rendering an image based on the electronic image data, capturing the rendered image, the captured image including captured image data, registering the electronic image with the captured image, identifying at least one region of interest in the electronic image, and comparing the electronic image data of the at least one region of interest in the electronic image and the captured image data of a corresponding region to determine a colorant error.

U.S. Pub. No. 2006/0115284, entitled SEMI-AUTOMATIC IMAGE QUALITY ADJUSTMENT FOR MULTIPLE MARKING ENGINE SYSTEMS, by Robert E. Grace, et al., discloses a method for controlling image consistency in an image rendering system which includes predetermining a test image, printing first and second rendered versions of the test image on print media with first and second marking engines and generating computer readable representations thereof with an image input device. Image consistency information is generated and, if necessary, at least one aspect of the image rendering system is adjusted, in a manner predetermined to improve image consistency, based on the determined image consistency information.

U.S. Pub. No. 2006/0209101, published Sep. 21, 2006, entitled SYSTEMS AND METHODS FOR MEASURING UNIFORMITY IN IMAGES, by Howard A. Mizes, discloses a method for measuring spatial uniformity in an image, which includes printing a test pattern from an image forming device including a plurality of strips and rows of fiducials proximal thereto and correcting for distortions in an image caused by printing and scanning artifacts.

BRIEF DESCRIPTION

In accordance with one aspect of the exemplary embodiment disclosed herein, a system for visualizing a print job includes a print job simulator which applies a print job model to print job image data to generate an image which simulates a rendered image of the print job if the print job were to be printed on a specific marking device. A display in communication with the print job simulator is provided for displaying the simulation image.

In accordance with another aspect, a method of visualizing a print job includes applying a print job model to print job image data to generate an image which simulates a rendered image of the print job if the print job were to be printed on a specific marking device and displaying the image which simulates the rendered image.

In another aspect, a printing system includes at least one marking device, each of the marking devices being configured for rendering a print job on print media. A model generator generates, for each of the marking devices, a print job model based, at least in part, on image data acquired by scanning a test image rendered by the marking device. A print job simulator applies at least one of the generated models to print job image data, whereby when the print job image data to which the model has been applied is displayed on a display, a defect in the print job which would appear if the print job were to be rendered on the at least one marking device is visualized.

DETAILED DESCRIPTION

Aspects of the exemplary embodiment relate to a print job visualization system. The system includes a print job simulator which provides a visual representation of a print job, as it would be rendered on a particular marking device, on a display. The print job simulator enables the user to evaluate any print defects associated with the marking device before sending the print job to the marking device for printing. The job simulator applies a model to the print job or a portion thereof. The model is based, at least in part, on information derived from the particular marking device.

Figure 1:
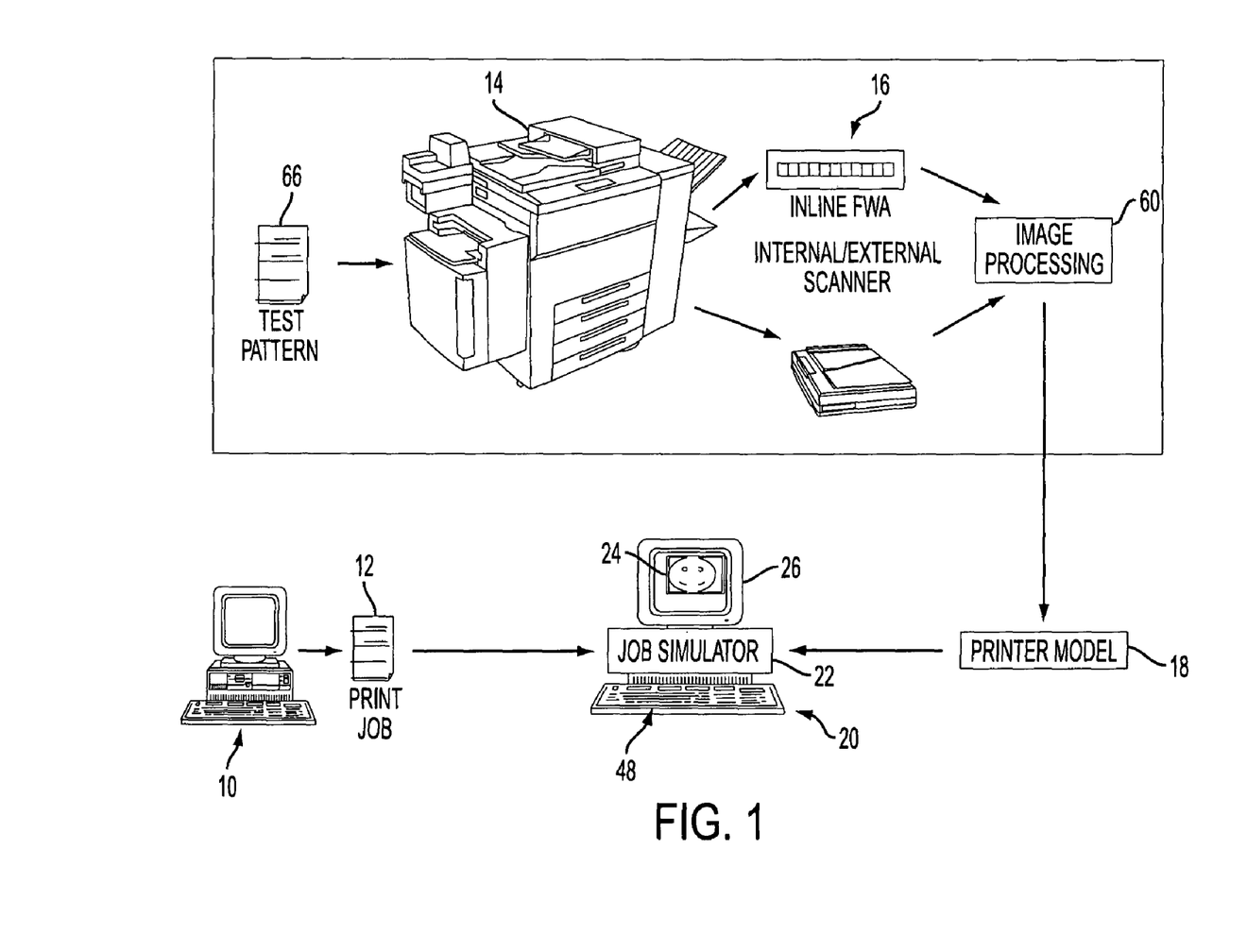
FIG. 1 is a schematic view of a printing network incorporating a print job simulator in accordance with one aspect of the exemplary embodiment.

With reference to FIG. 1, a network printing system includes an image data source 10, which provides image data, herein illustrated as a print job 12, for rendering on print media by an image rendering device, herein embodied in a printer 14. The printer 14 includes an image data acquisition device 16 for acquiring image data, herein illustrated as a full width array sensor and/or scanner. The acquired image data is used to generate a print job model 18. A print job visualization system 20 includes a print job simulator 22, which generates a preview 24 of the print job, based on the print job 12 and the model 18. The print job preview 24 is displayed on a display 26, illustrated as a color monitor. In this way, a user can view the simulated print job 24 before printing and determine whether the printer 14 will provide a satisfactory print. Or where multiple printers are available, the user may select the printer which yields the most satisfactory simulated print job.

Figure 2:
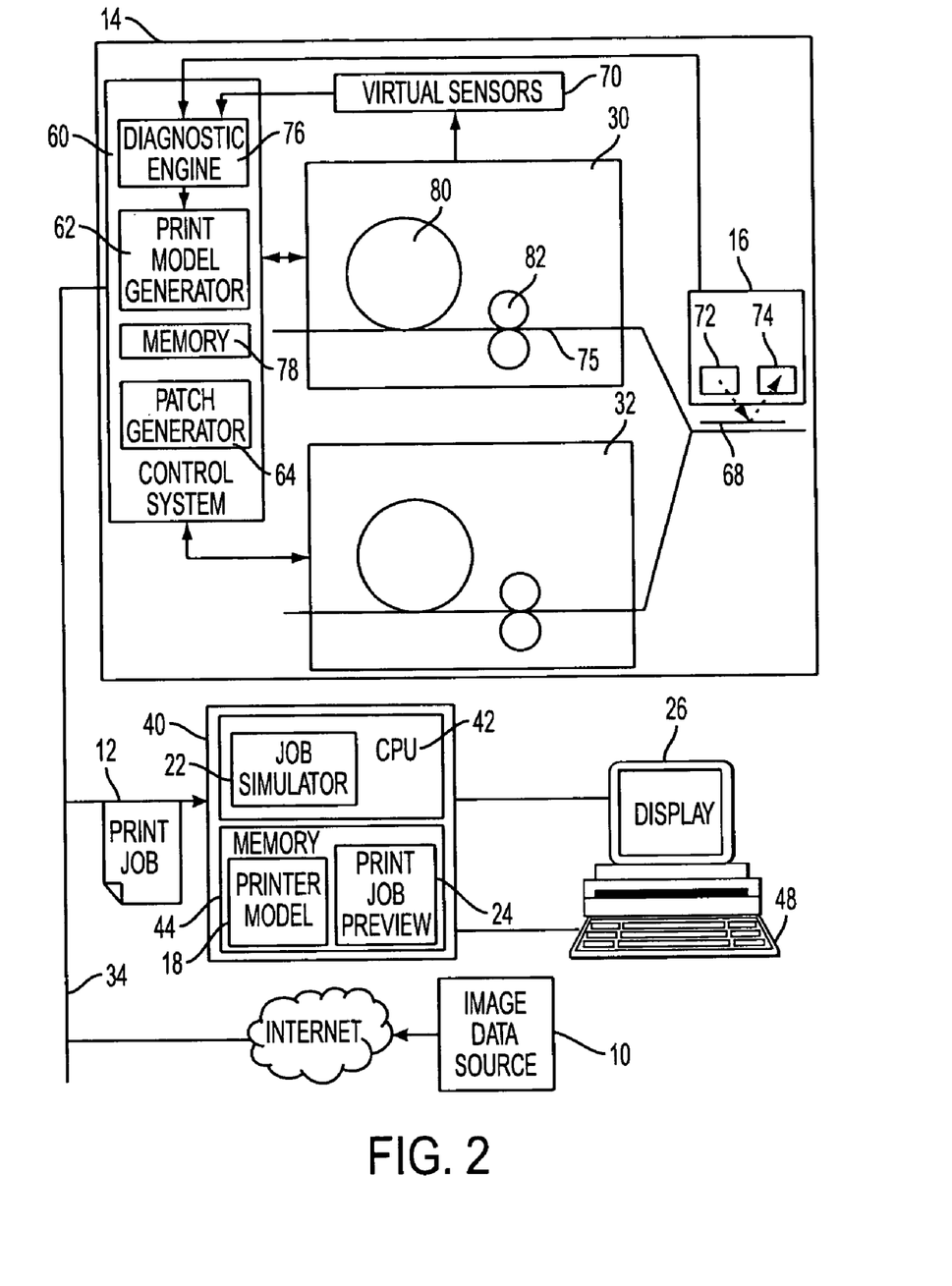
FIG. 2 is a functional block diagram of a printing network incorporating a print job simulator in accordance with another aspect of the exemplary embodiment.

With reference now to FIG. 2, a functional block diagram of a networked printing system is shown which incorporates the components shown in FIG. 1. In the illustrated printing system, a plurality of networked marking devices 30, 32, are connected to a network 34 and are selectable by a user for printing the image data 12, although fewer or more than two marking devices are contemplated. One or more of the marking devices 30, 32 may be incorporated into printer 14 or may be associated with separate printers. The job simulator 22 provides a device specific simulation of the print job by modifying the image data 12 to reflect print attributes of a selected marking device 30, 32.

As used herein, marking devices 30, 32 can include any device for rendering an image on print media. The marking devices may be single colorant (monochrome, e.g., black) marking devices or multiple colorant (color) marking devices, such as CMYK devices. The image rendering device 14 incorporating the marking device can be a copier, laser printer, bookmaking machine, facsimile machine, or a multifunction machine. "Print media" can be a usually flimsy physical sheet of paper, plastic, or other suitable physical print media substrate for images. A "print job" is normally a set of electronic document page images, from a particular user, or otherwise related. A print job may include one or more images. An image generally may include information in electronic form which is to be rendered on the print media by the image forming device and may include text, graphics, pictures, and the like. The operation of applying images to print media, for example, graphics, text, photographs, etc., is generally referred to herein as printing or marking.

The print job 12 may include colorant values for each pixel of a two dimensional array of pixels for each image in the print job. The colorant values for the pixels in the print job may be device independent values, such as RGB, $L^*,a^*,b^*$, or CMYK values. As is known in the art, part of the operation of printing involves mapping the colorant values of the print job to device dependent colorant values, such as CMYK values for pixels of the rendered image, the mapping being intended to reproduce, to the extent possible, the appearance of the original image. The print job 12 may also include instructions for printing the print job. For example, the instructions may be in the form of an associated job ticket. The job ticket may designate a marking engine for printing and/or include information about the paper to be used, such as its size, weight etc, e.g., by designating a particular paper source tray.

The image data source 10 can be a locally or remotely located desk top or laptop computer, a personal digital assistant (PDA), a scanner, a facsimile machine, a digital camera, memory storage device, such as a floppy disk, flexible disk, hard disk, magnetic tape, or any other magnetic storage medium, CD-ROM, DVD, or any other optical medium, a RAM, a PROM, an EPROM, a FLASH-EPROM, or other memory chip or cartridge or other device suitable for storing and/or transmitting electronic color image data to the network 34. The image data source 10 may interface with the network 34 via a wired or wireless connection, such as a direct wired connection, a connection over a LAN, a WAN, or any other distributed network, the Internet, a connection over the public switched telephone network, a connection over a cellular telephone network, a satellite connection or the like.

The print job simulator 22 may be a software component which is run on a computer 40, such as a general purpose computer or a dedicated computing device. In the illustrated embodiment, the computer 40 includes a processing component 42 in the form of a central processing unit (CPU) which executes instructions stored in associated memory 44. The job simulator 22 may be incorporated into the CPU 42 or installed as a plug in component. The job simulator 22 includes instructions for retrieving a print job 12 from memory, such as memory 44 or a separate memory, retrieving the model 18 of the printer from memory 44 (or a separate memory) and modifying the print job based on the stored model 18, for example, by merging the model 18 with image data comprising an image of the print job 12 to produce a merged image. The job simulator 22 may further include instructions for displaying the merged image 24 on the display 26. In various embodiments, the job simulator 22 may cause a portion which is less than the entire merged image 24 to be displayed such that a defect in the merged image introduced by the model is more readily apparent to a customer viewing the display. The memory 44 may store models 18 from two or more marking devices 30, 32, such that a user may compare merged images 24 formed by merging the print job image with each of the models in turn or in side-by-side display. While the illustrated job simulator 22 is located in a computing device 40 which is remote from printer 14, it is to be appreciated that the job simulator 22 may be located anywhere in the network, such as on printer 14.

The memory 44 may represent any type of computer readable medium such as random access memory (RAM), read only memory (ROM), magnetic disk or tape, optical disk, flash memory, or holographic memory. In one embodiment, the memory 44 comprises a combination of random access memory and read only memory. In some embodiments, the processor 42 and memory 44 may be combined in a single chip. A network interface (not shown) allows the computer 40 to communicate with other devices via the network 34, and may comprise a modulator/demodulator (MODEM).

The display 26 may be a color monitor which is calibrated at intervals to provide an accurate representation of colors of an image. While the illustrated display 26 is linked to remote computer 40, it is also contemplated that display 26 may be located elsewhere, such as be a part of the printer 14, such as a graphical user interface for the printer, or be associated with image data source 10.

A user interface 48, such as a keyboard, touch screen, cursor control device, or combination thereof, permits interaction of a user with the computer 40. For example, the customer may use the user interface 48 to request the job simulator 22 to simulate a print job 12 and/or may use the interface 48 for selecting portions of the displayed simulation 24 for examination, for example, by enlarging a portion of the on-screen image representing the simulated print job 24. As will be appreciated, the source 10 of the print job 12 may be the same computer 40 as is used for the job simulation.

Figure 3:
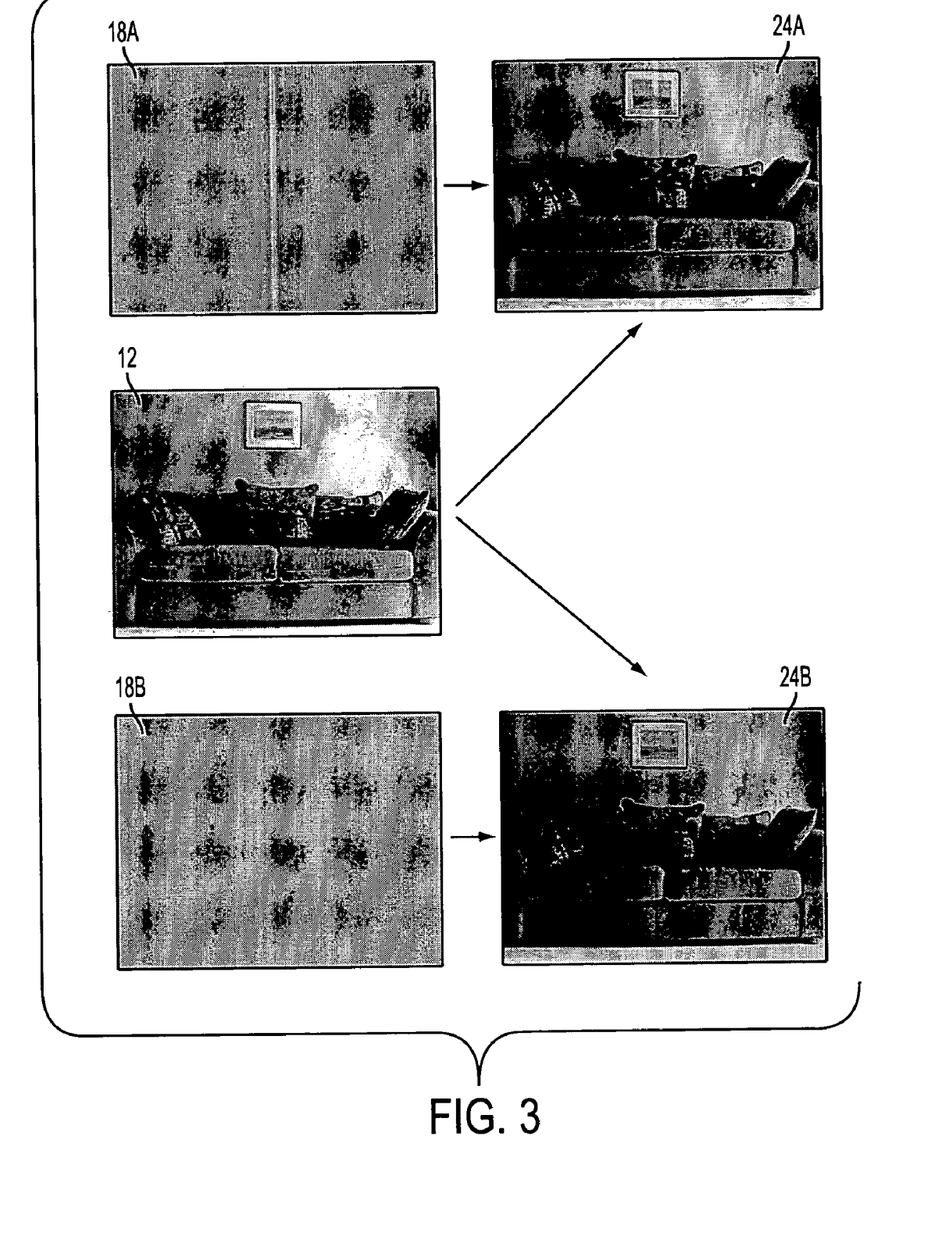
FIG. 3 illustrates the formation of a simulation image by selectively merging printer models with an image that is yet to be printed.

FIG. 3 illustrates two exemplary banding models 18A and 18B from different marking devices 30, 32. The first model 18A incorporates a banding defect which introduces a vertical line in the middle of the image. The second model 18B incorporates parallel bands of different gray level intensities across the image. When merged with the print job image 12, the resulting preview images 24A, 24B, respectively, incorporate the defects of the models 18A, 18B, allowing a user to view an on-screen representation of the as-yet unprinted print job, substantially as it would be rendered by the selected marking device 30 or 32. A similar process may be used for other models such as out-of-gamut mapping, spots, streaks, and the like.

The printer model 18 may comprise gray level values for a single colorant or for multiple colorants. If desired, multiple models 18 may be combined to produce a composite visualization 24. Different models 18 may be provided for the different pitches of the photoreceptor or intermediate transfer belts and be selected according to which pitch would be used in printing the print job 12. Additionally, the model 18 may take into account human perception sensitivity to produce a more realistic representation of the perceived image quality. For accurate color representation, the simulated print job image 24 may be displayed on a color calibrated monitor 26 for more accurate results.

The model 18 may be updated periodically. For example, the job simulator 22 may request an updated model 18 from the printer 14 for each of the marking devices 30, 32, or for a selected one of the marking devices, when simulating the print job. Or, an updated model 18 or models may be automatically sent at intervals from each of the networked printers 14 or marking devices 30, 32.

Turning now to the exemplary printer 14, the printer includes a control system 60 which may include a processor, such as a CPU which executes instructions stored in memory. The control system 60 receives incoming print jobs 12 and converts them into image signals in a suitable form for rendering on print media by the marking device 14. In the illustrated embodiment, the control system 60 provides additional control functions for monitoring the marking device 30 and/or marking device 32. In particular, the control system 60 includes a print model generator 62 which processes information received directly or indirectly from the marking device 30, 32, including the acquired image data from the sensor 16, and generates a printer model 18 therefrom. The print model generator 62 may also utilize the information for real-time modifying of the colors to be printed of jobs submitted to the marking device 30, 32 or this function may be performed by a separate processing component of the control system. While the exemplary print model generator 62 is illustrated as being a part of the printer 14, it is to be appreciated that the print model generator 62 may be located wholly or partly elsewhere on the network 34, such as on computer 40, and may receive information from the control system 60, such as the acquired image data or information on defects etc. derived therefrom.

The control system 60 also includes a test image generator 64 which generates image data for a test pattern 66 (FIG. 1). The test pattern may include one or more color test patches, which when rendered, may be used for evaluation of the rendering capabilities of a marking device 30, 32.

The illustrated sensor 16 captures image data from a rendered image 68, which may be a rendered test image generated by printing the test pattern 66, and provides captured image data to the model generator 62 either directly, or via an intermediate processing component. In addition to receiving information from the sensor 16, the print model generator 62 may receive information directly or indirectly from one or more virtual sensors 70. Virtual sensors may be used to supplement the information obtained by the sensor 16. Virtual sensors 70 may be incorporated into a printer 14 to identify the source of a defect detected by the sensor 16 or for other diagnostic purposes. The model generator 62 may utilize information derived from the sensor data and/or virtual sensors 70 in generating the model 18.

The sensor 16 may be a full width array (FWA) sensor, such as a spectrophotometer which scans the rendered image 68 and generates digitized image data for each scanned line. In the illustrated embodiment, the sensor 16 includes a light source 72, such as an LED bar or other light source which directs light to on to the image and a detector 74, which detects light reflected from the sheet containing the rendered image. An exemplary spectrophotometer 16 includes one or two substantially linear elongated arrays of closely spaced multiple LED illumination sources transversely spanning the printer paper path 75 and which are sequentially illuminated to illuminate a transverse band across a printed sheet moving in the paper path, and a corresponding array of multiple closely spaced different color sensitive photodetectors, which are positioned to detect and analyze light reflected from the sheet. The sensor 16 may measure one or more of the optical density of a color test image outputted by the color marking device 30, 32, the trichometric description, such as, for example, RGB or L*, a*, b*, of the color test image outputted by marking device 30, 32, and/or the reflectance spectra of the color test image outputted by the marking device 30, 32.

Various types of color spectrophotometer systems suited to use as an on-line sensor 16 are disclosed, for example, in U.S. Pat. Nos. 6,384,918; 6,663,382 and 6,639,669, all to Fred F. Hubble, III, et al., U.S. Pat. Nos. 6,690,471 and 6,621,576 to Tandon, et al., U.S. Pat. Nos. 6,351,308; 6,538,770; and 6,975,949 to Mestha, et al.; and Pub. No. 2005/0160092, the disclosures of which are incorporated herein by reference, in their entireties.

It is to be appreciated that the sensor 16 can be an on-line sensor, such as one which is located within the printer 14 for example, in an output tray, or, alternatively, may be a stand-alone device or incorporated into, for example, a dedicated scanner and diagnostic system. Also, the printing and scanning process can be completely automated if a transport mechanism is available to convey the printed test pattern 68 to the sensor 16, for example, in the case where the sensor 16 is incorporated into the printer 14. In one embodiment, two or more marking devices 30, 32 output rendered images which are scanned by the same sensor 16, e.g., by providing suitable conveyor paths between the marking devices and the sensor. Alternatively, each marking device 30, 32 may be associated with its own dedicated sensor 16.

While the sensor 16 may detect values of multiple colorants for each pixel it may detect only a single colorant or may detect luminosity of the image. Alternatively, or additionally the sensor 16 may include a gloss meter which measures the specular reflection of the image.

The digitized images of the rendered test patterns 66 or actual print jobs produced by sensor 16 are forwarded to the printer model generator 62, or intermediate processing component. For example, the color sensor 16 may transmit data after completing all the measurements from multiple sheets. Alternatively, the color sensor 16 transmits data during or after the marking of each sheet either via a wired or wireless connection to printer model generator 62.

The print model generator 62 (or intermediate processing component) analyzes the image, using commonly known image processing techniques such as, for example, Fourier transform analysis, histogramming, edge detection, 1-D projections, segmentation, classification, artifact detection, FIR filtering, morphological analysis, wavelet analysis and statistical analysis pattern recognition techniques, neural networks, or the like, to evaluate image quality parameters and/or identify defects in the image(s). Furthermore, the image processing may compensate via a calibration circuit for at least some of defects introduced by the sensor 16, and then determine the image quality parameters and/or detect the presence of any defects in the printed document.

The print model generator 62 (or intermediate processing component) may detect the presence of one or more of a set of defects in the input scanned image and/or calculates the values of one or more image quality parameters. Such defects and parameters include, but are not limited to, lines, bands, streaks, spots, mottle, halo, splatter, light images, dark images, blank images, deletions, background ink contamination, graininess, ghosting, skew, registration defects, color balance, color registration, color variation within a page, print-to-print variation, inboard-outboard variation, loss of a tone-reproduction, line width, edge width, line density, line edge, line shape, sharpness, contours, reload, pixel to pixel placement defects, and the like. In particular, the image quality analysis and defect recognition may be accomplished through the use of image processing and/or pattern recognition algorithms such as those described in U.S. Pat. Nos. 6,665,425 and 6,519,552, by Sampath, et al., incorporated herein by reference in their entirety. For example, frequency banding information may be obtained from vibration sensors. Certain streak related information may be obtained by measuring ground current variations. The print model generator 62 may utilize this defect-related information in generating a model or models 18.

The image processing component 62 may utilize information gained from Automated Image Quality Diagnostics (AIQD) techniques, which may be input into the model. Such techniques have heretofore been used to aid in diagnostics. For example, in an Advanced Image Quality Diagnostics (AIQD) system, the printer 14 makes use of image data, machine data, and human observation to diagnose print defects. A customer observing a faulty print can launch AIQD software which may instruct the customer to scan the problem print. Diagnostic tools collect and analyze data from the image itself and also from the printer's internal diagnostic systems. Using a combination of quantitative analysis and qualitative reasoning, the AIQD program then obtains a diagnosis and recommendation. Possible solutions include machine self-repair, repair by customer, or instructions to contact the service technician.

Suitable virtual sensors 70 which may be utilized in such diagnostic systems are described, for example, in U.S. Pat. Nos. 6,665,425 and 6,519,552, by Sampath, et al., the disclosures of which are incorporated herein by reference. In the present embodiment, information derived from the virtual sensors 70 may be used in generating the model 18. For example, the virtual sensors 70 may, as their primary function, serve to diagnose machine failures down to the individual component, an easily replaceable unit, or a customer replaceable unit and may be used to augment the information provided by the real sensors 16. Some virtual sensors 70 may provide quantitative analysis of machine signals, such as, for example, ground return line currents, in order to extract useful diagnostic information from the signals. Other virtual sensors 70 may be counters that keep track of signal changes, fault counts, calibration runs, pages processed, etc. Depending on the type of printer 14, the nature of the failures to be diagnosed, and the nature of the available information, a variety of different techniques of varying complexity can be used for the virtual sensors. Such techniques, may include one or more of threshold analysis, statistical analysis, such as means and variance analysis, signature analysis, pattern analysis, trend analysis, event sequence analysis, timing analysis, rate analysis, counting mechanisms, such as, for example, signal change counters, state estimation analysis, and the like.

In normal operation of the printer 14, data is collected from real sensor 16 and virtual sensors 70 and is processed by the control system, e.g., by a suitable diagnostic engine 76, which applies suitable reasoning algorithms for isolating the root of the cause for failures, actual or impending, including those responsible for print quality defects. The diagnostic engine 76 can be based on one or more of the following diagnostic/prognostic technologies, for example, model based diagnosis, deterministic discrete event systems diagnosis, Bayesian networks, causal networks, neural networks, artificial intelligence, rule-based systems, expert systems, fuzzy logic analysis, and/or look-up tables. Therefore, based on the analysis of the data derived from the real and virtual sensors, the diagnostic engine determines the list of components that have failed, are suspected to have failed or estimated to fail. Based on the diagnosis, the control system 60 may request the printing of specific test prints, acquisition of data by the sensor 16, and determine what image quality parameters are to be determined and/or what defects are to be recognized and characterized. The printer 14 is then directed to produce one or more test pattern prints, stored either in its internal memory 78, or on a network drive in a distributed network environment. The test pattern prints are then forwarded to the sensor 16 for digitizing. Alternately, the customer, the customer service engineer, or the like, can directly scan the hard copy test prints.

Diagnostic systems of this type are disclosed, for example, in U.S. application Ser. No. 11/170,638, U.S. Publication No. 2005/0036171; and in U.S. Pat. Nos. 6,862,414; 6,892,317; 6,665,425; 7,095,531; 6,819,352; and 7,054,568, incorporated by reference herein. In general, such diagnostic systems develop a model of a printer 14 by sensing/measuring the actual output of the printer 14. Those measurements are then used for specific purposes. In the present exemplary embodiment, the measurements and models developed by the diagnostic systems can be exploited for the purpose of visualizing the print output prior to printing it. For example, one or more of banding, streaks, spots, non-uniformities, out-of-gamut situations, color infidelities, and the like is measured and modeled. The model(s) 18 are then used to show the customer what the output would look like without actually printing it. This enables the customer to view a simulation of the print job on a given printer 14.

In the present embodiment, the print model generator 62 may use the information generated by the virtual sensors 70, or information derived therefrom by an intermediate processing component such as diagnostic engine 76, in deriving the model 18. In particular, the model generator may utilize one or more of the image processing/analysis and psychophysical information generated by the printer sensors, image quality metrics like uniformity, banding, streaks, spots, etc constructed therefrom, and repair or replacement actions identified by the diagnostic engine 76. In the present embodiment, such information is used by the print model generator 62 to generate the model 18 of the printer 14 and/or a specific marking device where the printer 14 includes two or more marking devices.

For example, the diagnostic engine 76 may determine that a component of the printer, such as. the fuser, is responsible for an image defect and needs to be replaced. Based on this information, the model generator 62 assumes that the fuser replacement will not occur before printing of the print job and uses the defects identified by the sensor16 in generating the model. On the other hand, the diagnostic engine 76 may determine that a cause of a defect can be corrected automatically by the printer in a short time, such as a fuser temperature which is too high and can be readily reduced. In this case, the model generator 62 takes into account the ability of the printer to correct the defect and modifies the model 18 accordingly to reflect the predicted removal or reduction of the defect.

Other image defect evaluation techniques may also be utilized for generating information which may be incorporated into the model 18. For example, tone reproduction curve correction models used to compensate for static defects, like streaks may be incorporated into the model. In general, these detection techniques use a digitized version of a printed test pattern to develop a model of the defect. The data acquired during the detection and/or correction phase may also be utilized in the exemplary embodiment in development of the printer model 18.

Techniques have been developed to minimize color variations. These include out-of-gamut mapping, consistent color, automated color calibration and the like. In general, color consistency techniques rely on the detection of small changes in the color of rendered images, e.g., with a spectrophotometer, and automated correction in subsequent copies. Out of gamut mapping techniques are designed to map colors of an image to be printed to the gamut of the designated marking device by identifying those colors within the marking device's gamut which are closest to colors of the image which are outside the gamut. Information generated during such techniques may also be used in the printer model 18 described herein.

The model 18 may include any device-specific information, such as an algorithm, tone reproduction curve(s), difference profile(s), or multiples or combinations thereof for modifying the print job image 12 to reflect the predicted output of a designated marking device 30, 32. The model 18 may be stored in memory 78 on the printer and supplied to the visualization system on demand or automatically.

In one embodiment, the model 18 includes a difference profile. The difference profile may be generated by printing a test image (i.e., not an image of the print job), determining a reflectance profile of the printed image, and comparing the reflectance profile with a uniform profile, as described, for example, in U.S. Pub. No. 2006/0001911, incorporated by reference. The difference profile may be modified to reflect the ability of the printer to correct for any defects through modification of the tone reproduction curves, etc. prior to actual printing of the job and/or to incorporate defect-related information obtained from other sensors. The difference profile may include colorant values (gray levels) in the same color space as the print job, e.g., RGB values, or one or both of the model or print job may be converted to a common color space.

In one embodiment the model 18 may include luminosity values to be imposed upon the pixels of the image.

In another embodiment, the model 18 may include one or more tone reproduction curves. For example, a plurality of tone reproduction curves may be provided which vary in the process (or cross process) direction to simulate banding or streaking. When applied to the print job image, the banding or streaking which would be introduced by the selected marking engine is shown in the image 24.

The marking devices 30, 32, respectively, may comprise any suitable device for applying images to print media, such as xerographic marking devices, inkjet marking devices, or the like. For example, in the case of a xerographic marking device, the marking device includes many of the hardware elements employed in the creation of desired images by electrophotographical processes. In the case of a xerographic device, the marking device typically includes a charge retentive surface, such as a rotating photoreceptor in the form of a belt or drum 80. The images are created on a surface of the photoreceptor. Disposed at various points around the circumference of the photoreceptor are xerographic subsystems which include a cleaning device, a charging station for each of the colors to be applied (one in the case of a monochrome marking device, four in the case of a CMYK marking device), such as a charging corotron, an exposure station, which forms a latent image on the photoreceptor, a developer unit, associated with each charging station for developing the latent image formed on the surface of the photoreceptor by applying a toner to obtain a toner image, a transferring unit, such as a transfer corotron, transfers the toner image thus formed to the surface of a print media substrate, such as a sheet of paper, and a fuser 82, which fuses the image to the sheet. The fuser generally applies at least one of heat and pressure to the sheet to physically attach the toner and optionally to provide a level of gloss to the printed media. While both illustrated marking devices 30, 32 may be similarly configured, it is also contemplated that the making devices may differ in one or more respects.

Figure 4:
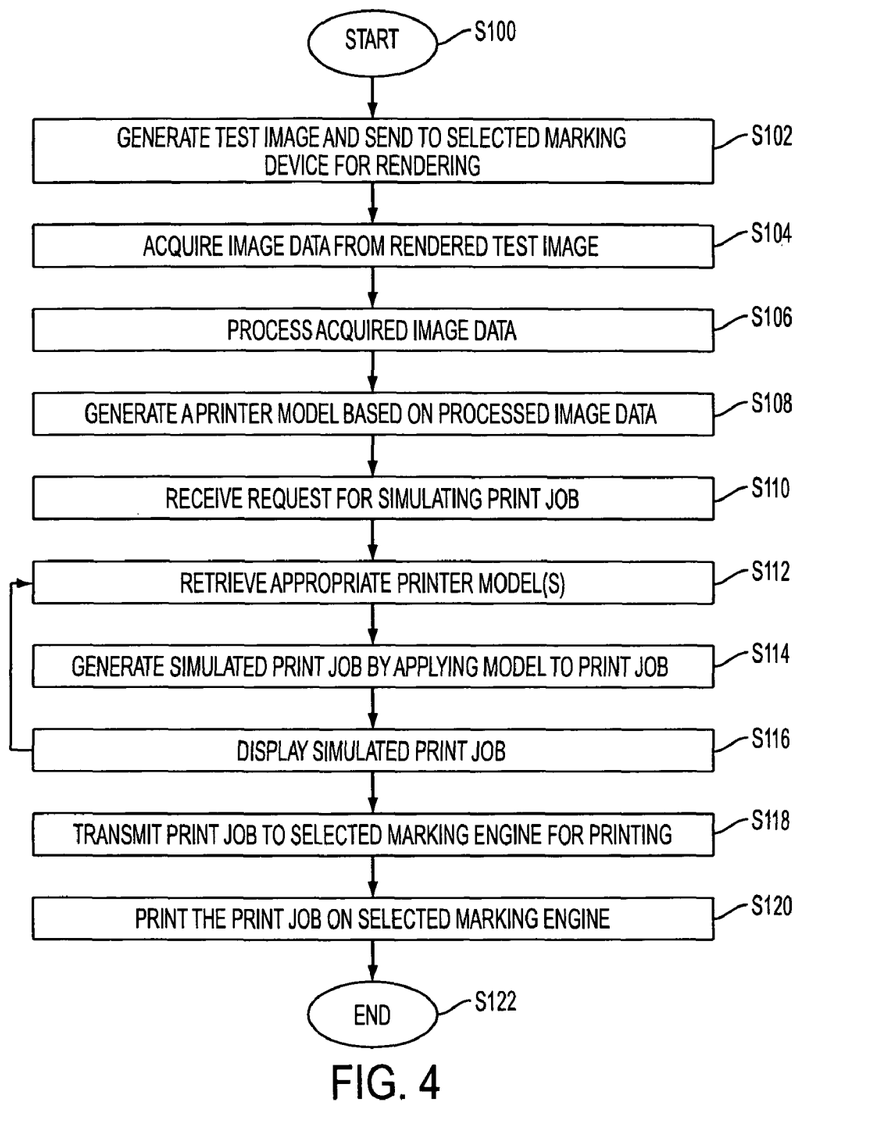
FIG. 4 is a flow diagram illustrating an exemplary method of providing a visual representation of a print job which simulates the print job as it would be rendered on a particular marking device.

With reference to FIG. 4, a method for simulating a print job prior to printing is shown. The method may be performed in a networked printing system, as shown, or with a print job visualization system which is isolated from a printing system. As will be appreciated, the method may include fewer, more or different steps and that the steps need not proceed in the order illustrated. The method begins at step S100.

At step S102, periodically, or upon request, the test image generator 64 sends image data comprising a test image 66 to a marking device, such as device 30, for rendering. The test image 66 generally comprises a print job having known and measurable color characteristics.

At step S104, the sensor 16 acquires image data from the rendered image 68.

At step S106, the image data is processed by the print model generator 62 or intermediate processing component.

The scanning of the test pattern and the image processing can occur on a periodic basis, especially if an inline full width array (FWA) sensor 16 is available. If a full width array sensor is not available, then an internal or external scanner can be utilized.

At step S108, the output of the image processing is used to build a printer model 18. The printer model 18 may be updated, over time, on a periodic or intermittent basis.

At step S110, the job simulator 22 receives a request to simulate a print job 12. The request may designate a particular printer/marking device for the simulation. The request may be initiated by a customer, for example, by placing a request via the user input device 48. Alternatively, the request may be associated with the print job itself, e.g. as a job ticket.

At step S112 the print job simulator 22 retrieves a printer model 18 from memory 44 or requests an updated printer model 18 from the designated printer 14. The job simulator 22 may select one or more models 18 from a set of available models, based on the properties of the print job, such as paper size, paper weight and the like. In the case of paper size, for example, different models may be appropriate for visualizing defects associated with the different pitches of the photoreceptor or intermediate transfer belts which may be used for different paper sizes.

At step S114, the job simulator 22 applies a selected model or models to the print job to generate a simulation of the print job. In particular, the job simulation may include incorporating information from one or models developed for a specific marking device or devices into print job image data for one or more images to be rendered. In one embodiment, multiple models may be combined to produce a composite visualization. Additionally, the visualization may take into account human perception sensitivity to produce a more realistic representation of the perceived image quality. For example, the job simulator 22 may accentuate a defect in the simulation so that it is more readily apparent to the customer, e.g., a defect may be shown in a different color from that which it would appear if rendered to distinguish the defect from the surrounding image. Alternatively or additionally, the job simulator 22 may select an appropriate region of the image to be displayed, the region being one in which a defect is identified. The region may be enlarged for display, i.e., larger than the same region of the yet to be rendered print job. The job simulator 22 may also request a color calibration of the display to ensure more accurate color reproduction. As will be appreciated, step S114 is generally performed without having rendered the print job, i.e., the print job itself is not used in generating the model for its simulation.

If the printer 14 utilizes a feedback control system such as an automated color correction (ACC) system, then the error signal from that control system may be used to modify the color rendering, and the like of the visualization. In ACC systems, a high-speed spectrophotometer 16 internal to the printer is used to capture image data from test images automatically printed at designated time intervals or after a designated number of printed pages. The outputs of the spectrometer are used to modify the tone reproduction curves (TRCs) used by the printer 14. Accordingly, the job simulator 22 (if not already done by the model 18) takes into account any correction which may be applied by the printer 14 in subsequent printing to correct a detected defect in a rendered test image.

At step S116, the job simulator 22 causes the simulation 24 to be displayed on display 26. Steps S108-S116 may be repeated for a plurality of models 18, allowing a user to select a printer/marking device.

At step S118, the customer may select to print the print job on the designated marking device 30, 32, or if more than one marking device is available, on a selected one or more of the marking devices. For example, if the customer determines, based on the print job simulation, that the marking device 30 will provide a satisfactory rendering of the print job 12, the print job may be sent to an appropriate printer 14 for rendering on the selected marking device or devices 30, 32. Or, the customer may delay printing until a cause of an image defect has been remediated, e.g., by the printer 14 itself, the customer, or other repair service.

At step S120, the printer 14 converts the print job image data to device specific image data and controls the marking device 30, 32 during rendering the print job on print media. The method ends at step S122.

The computer implemented steps of the method illustrated in FIG. 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 4, can be used to implement the method for simulating a print job.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
at least one marking device, each of the marking devices being configured for rendering a print job on print media;
a model generator which, for each of the marking devices, generates a print job model based, at least in part, on image data acquired by scanning a test image rendered by the marking device, the specific marking device being a xerographic marking device which includes a photoreceptor; and
a print job simulator which applies at least one of the generated models to print job image data different from the test image, whereby when the print job image data to which the model has been applied is displayed on a display, a defect in the print job which would appear if the print job were to be rendered on the at least one marking device is visualized.

2. The system of claim 1, wherein the print job model is derived at least in part from a diagnostic engine which diagnoses a cause of an image defect.

3. The system of claim 1, further comprising memory in communication with the print job simulator which stores the print job model.

4. The system of claim 3, wherein the memory stores a plurality of print job models for a plurality of marking devices and wherein the print job simulator applies a model for a selected one of the marking devices.

5. The system of claim 1, wherein the print job model is updated at intervals to reflect a change in the specific marking device detected by the sensor.

6. The system of claim 1, wherein the model comprises gray level values for a single colorant or for multiple colorants which is merged with print job image data to simulate the rendered image.

* * * * *